United States Patent [19]

Nagumo

[11] 4,200,884
[45] Apr. 29, 1980

[54] SIGNAL PROCESSING SYSTEM FOR A SOLID STATE TELEVISION CAMERA

[75] Inventor: Fumio Nagumo, Yokohama, Japan

[73] Assignee: Sony Corporation, Tokyo, Japan

[21] Appl. No.: 915,253

[22] Filed: Jun. 13, 1978

[30] Foreign Application Priority Data

Jun. 16, 1977 [JP] Japan ................... 52-71544

[51] Int. Cl.² .................... H04N 5/02; H04N 9/535
[52] U.S. Cl. ......................................... 358/11; 358/29
[58] Field of Search ................................... 358/11, 29

[56] References Cited

U.S. PATENT DOCUMENTS

| | | | |
|---|---|---|---|
| 3,512,094 | 5/1970 | Dann | 358/11 |
| 3,936,870 | 2/1976 | Nakamura | 358/29 |
| 4,007,488 | 2/1977 | Morishita | 358/29 |
| 4,071,853 | 1/1978 | Yamanaka | 358/41 |
| 4,095,254 | 6/1978 | Romeas | 358/11 |

Primary Examiner—David L. Stewart
Attorney, Agent, or Firm—Hill, Van Santen, Steadman, Chiara & Simpson

[57] ABSTRACT

An analog-signal gate circuit or sample-hold circuit is employed for processing a dot-sequential video signal derived from a solid state imaging device such as CCD imager. By changing a signal width, gain control operation is achieved, and phase shifting operation of the video signal is done by shifting an aperture center of the dot-sequential video signal. This system may be applied to a color signal conversion system wherein a dot-sequential color signal is converted directly to an NTSC color television signal. Further, white balance control for a solid state color television camera is another application of this system.

5 Claims, 37 Drawing Figures

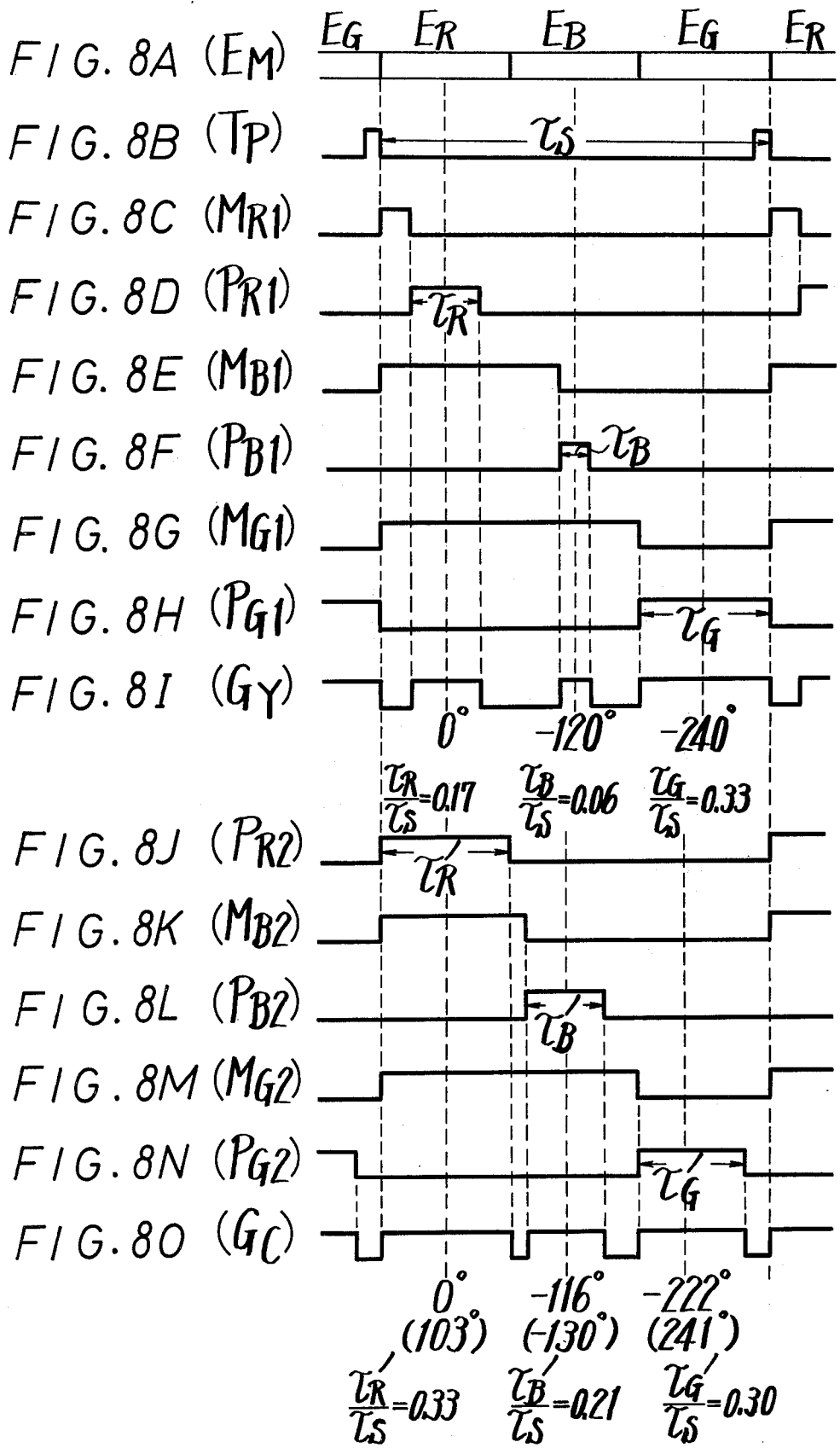

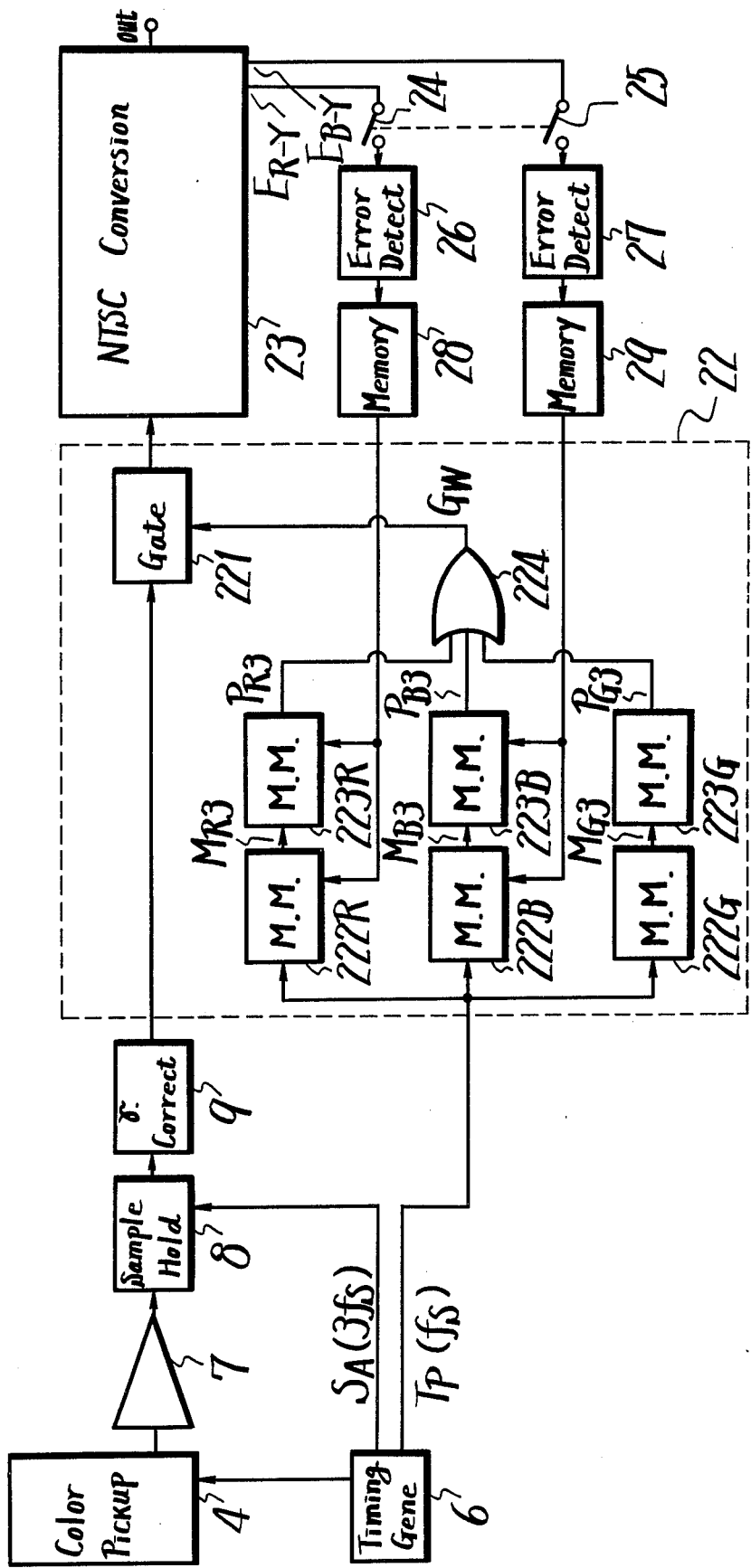

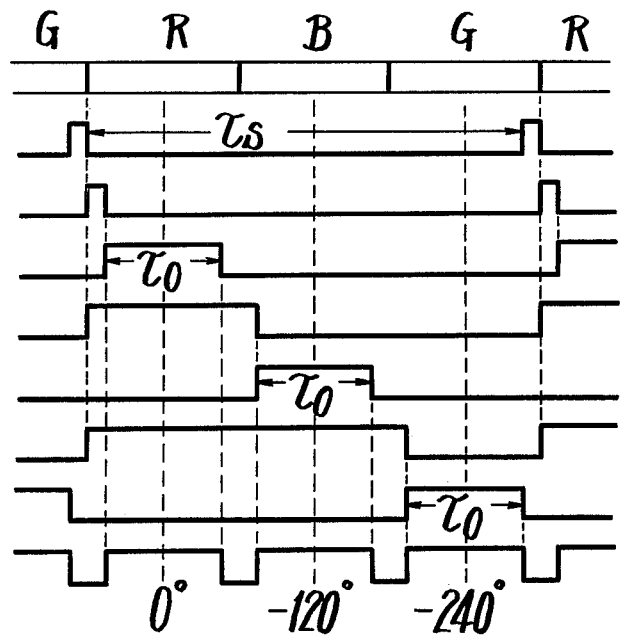
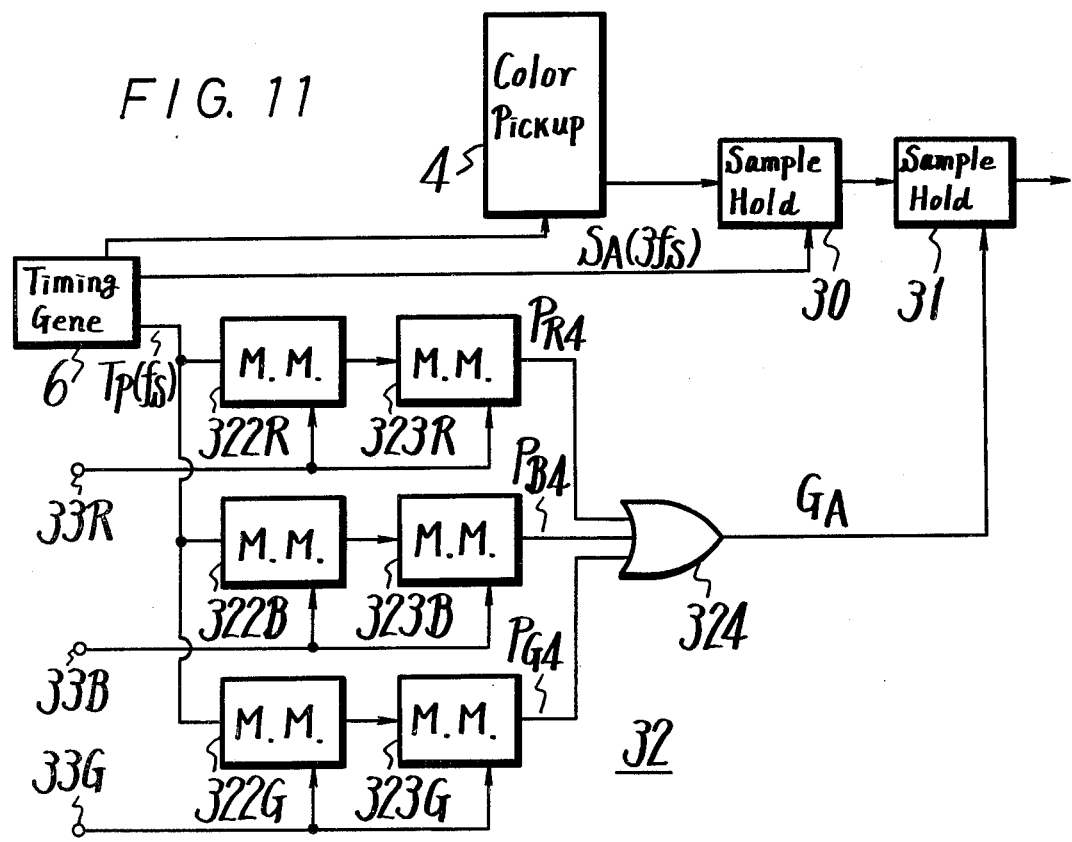

SIGNAL PROCESSING SYSTEM FOR A SOLID STATE TELEVISION CAMERA

BACKGROUND OF THE INVENTION

1. Field of the Invention

The present invention relates to a television camera using a solid state image sensor such as a CCD (charge-coupled device), and particularly to a signal processing system for the solid state television camera.

2. Description of the Prior Art

It is very conventional to use an image pickup tube for generating a television signal. A video signal from the image pickup tube is processed through a well-known gain control circuit, phase shifting circuit and so on, so that the resultant processed video signal is ready for use as a standard television signal.

Recently, solid state imaging devices have been developed in many laboratories in accordance with the advancement of semiconductor technology. Among various types of solid state image sensors, a CCD imager is of particular interest.

One difference between a solid state image sensor and a conventional image pickup tube is in the number of available picture elements. That is, in the conventional image pickup tube, the number of picture elements has been considered relatively unlimited. Meanwhile, in the solid state imager, the number of picture elements are clearly defined and the output signal is in the form of a dot-sequential signal.

In a prior art circuit for use in television cameras utilizing a normal image pickup tube, there is a signal processing circuit for the solid state television camera, so that the inherent characteristics of signals derived from the solid state imager have not been effectively utilized. Further, in the prior art, an output signal from the solid state image sensor has been processed by using a conventional gain control circuit and/or a phase shifting circuit.

SUMMARY OF THE INVENTION

It is a main object of this invention to provide a novel solid state television camera.

It is another object of this invention to provide an improved signal processing system for a solid state television camera using an analog-signal gate or sample-hold circuit.

In the sample-hold circuit or analog-signal gate circuit, changing the holding time duration without changing the aperture center of the dot-sequential signal requires a gain control operation. Also, shifting the aperture center of the dot-sequential signal without changing the holding duration requires shifting the phase of the signal. In this embodiment of the invention, the analog-signal gate circuit can be used instead of the sample-hold circuit.

According to this invention, the basic operation of this system includes a gain control means. A typical example of this gain control means is represented by an embodiment for a white balance control system of a solid state color camera. Further, a direct NTSC conversion system is achieved by applying the phase shifting operation and gain control operation to a dot-sequential color television signal directly obtained from the solid state color television camera.

The other objects, features and advantages of the present invention will be apparent from the following description taken in conjunction with the accompanying drawings.

BRIEF DESCRIPTION OF THE DRAWINGS

FIGS. 8A through 8O are waveform diagrams used for explaining the circuit of FIG. 4, FIG. 9 is a block diagram showing another example of a signal processing system for a solid state television camera of this invention, FIGS. 10A through 10I are waveform diagrams used for explaining the circuit of FIG. 9, and FIG. 11 is a block diagram showing a further example of a signal processing system for a solid state television camera of this invention.

DESCRIPTION OF THE PREFERRED EMBODIMENTS

Figure 1:
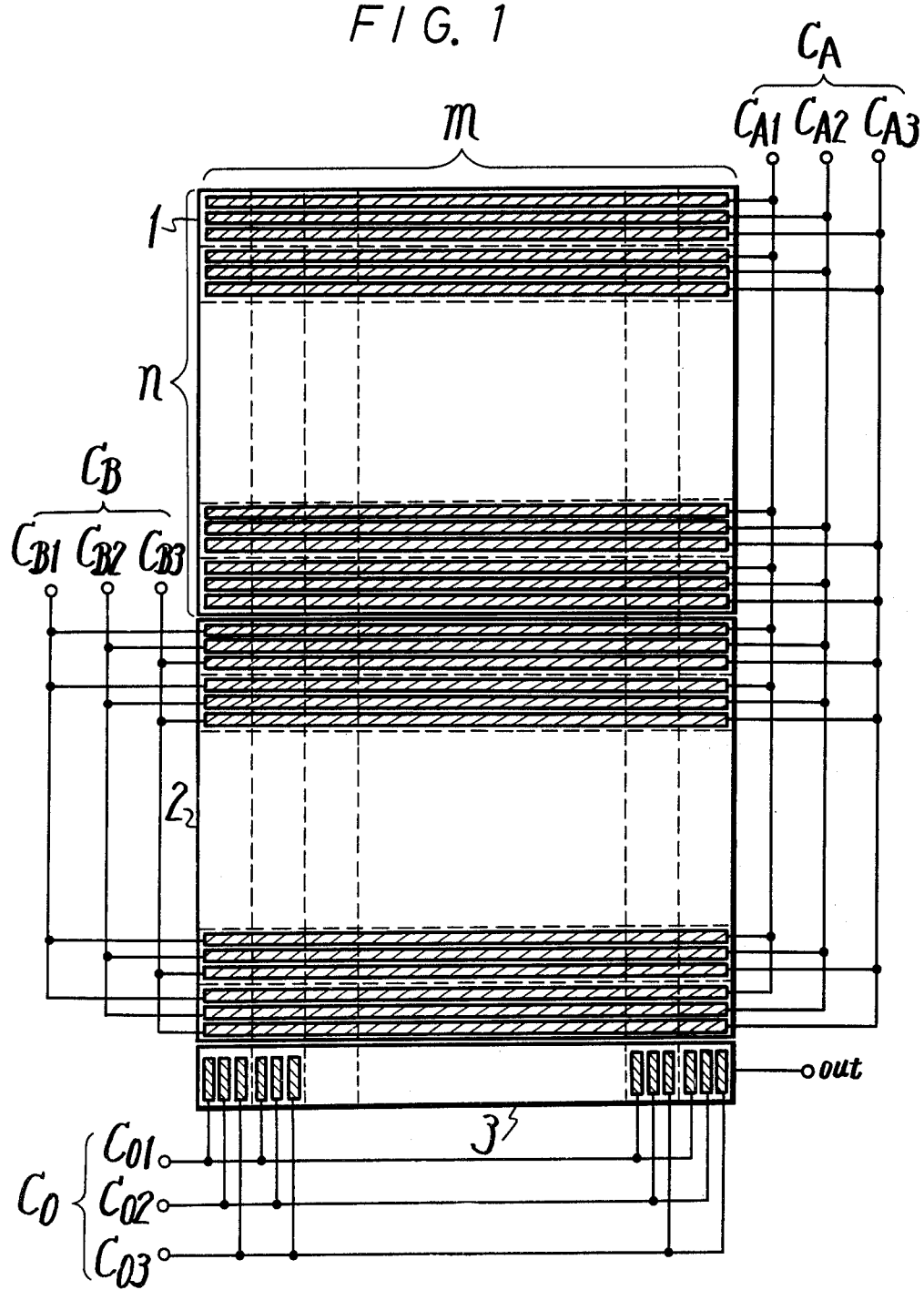
FIG. 1 is a view used for explaining one example of a solid state image pickup device.
Figure 2:
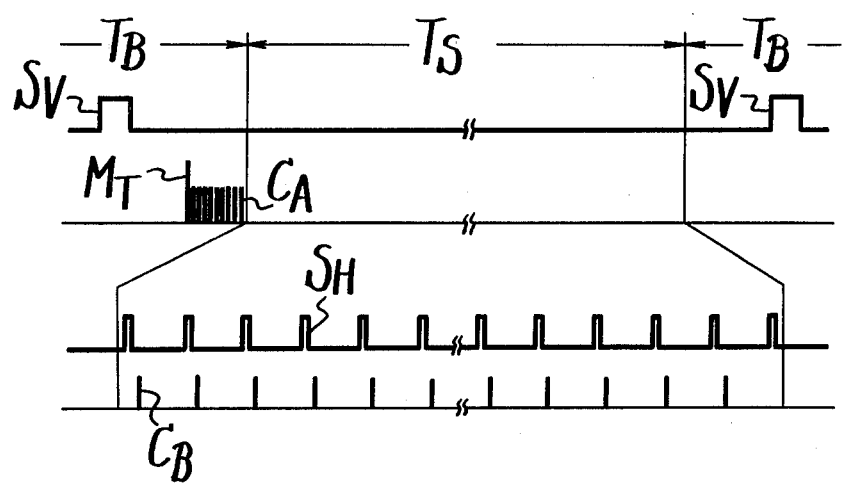
FIG. 2 is a waveform diagram used for the above explanation.

Before starting the explanation of this invention, a description will now be given of one example of a solid state imaging device using CCD technology, as shown in FIG. 1, which is composed of a photo sensitive area 1 defined by m number of picture elements in the horizontal direction of a picture screen and n number of picture elements in the vertical direction to provide a total of mn picture elements. A similarly arranged but optically shielded storage area 2 is provided as well as an output shift register 3, each for m number of bits. This solid state imaging device is operated in such a manner that an object to be televised is picked up by a solid stage image sensor which generates electric charges in the photo sensitive area 1 during each vertical scanning interval $T_S$, and these electric charges are then sequentially transferred to the storage area 2 line by line in accordance with n number of transfer pulses $C_A$. These pulses are shown in FIG. 2 and follow a marker signal $M_T$ indicating transfer start within the next vertical retrace interval $T_B$ which includes a vertical synchronizing signal $S_V$. After these charges have been all transferred to the storage area 2, within the next vertical scanning interval $T_S$, the charges for every line are sequentially transferred to the output shift register 3 by a transfer pulse $C_B$ at a time after a horizontal synchronizing signal $S_H$ within each horizontal retrace interval. In the output shift register 3, these charges are adapted to be read out at its output terminal in a series manner for every m number of bits by a transfer pulse $C_O$ during the respective horizontal scanning interval. The transfer pulses $C_A$, $C_B$ and $C_O$ are composed of 3-phase clock pulses $C_{A1}$, $C_{A2}$ and $C_{A3}$; $C_{B1}$, $C_{B2}$ and $C_{B3}$; and $C_{O1}$, $C_{O2}$ and $C_{O3}$, respectively.

Figure 3:
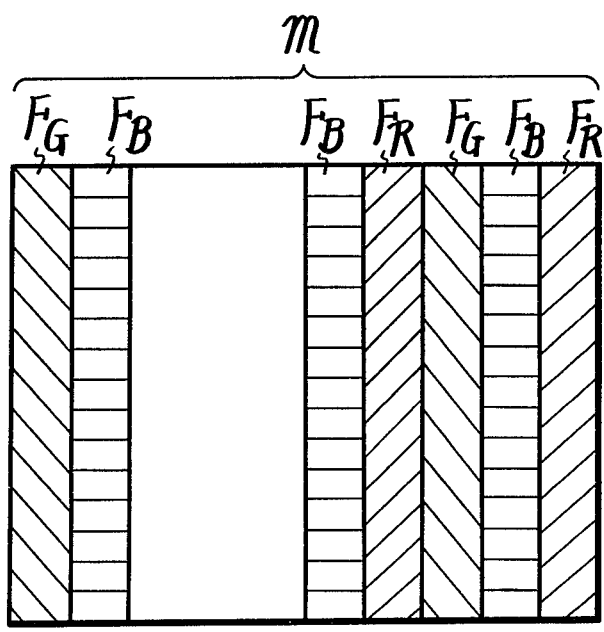
FIG. 3 is a plan view showing one example of a color coding filter.

In this example, a color coding filter as shown in FIG. 3 is disposed in front of the photo sensitive area 1 in case of a color camera system. In other words, the color coding filter is formed with three kinds of striped filters each of the same width. Striped filter $F_R$ is for passing therethrough red color light, striped filter $F_G$ is for passing therethrough green color light, and striped filter is $F_B$ for passing therethrough blue color light. The strips $F_R$, $F_G$ and $F_B$ are arranged in a sequentially repeated manner as $F_R$, $F_B$, $F_G$, $F_R$, $F_B$, $F_G$ ..., each corresponding to one column of the picture elements of the image sensing area 1.

With the above arrangement, there is obtained from the CCD a dot-sequential color signal comprising an output signal $E_R$ for red color light, an output signal $E_G$ for green color light, and an output signal $E_B$ for blue color light which are sequentially repeated as $E_R$, $E_B$, $E_G$, $E_R$, $E_B$, $E_G$ ....

Figure 4:
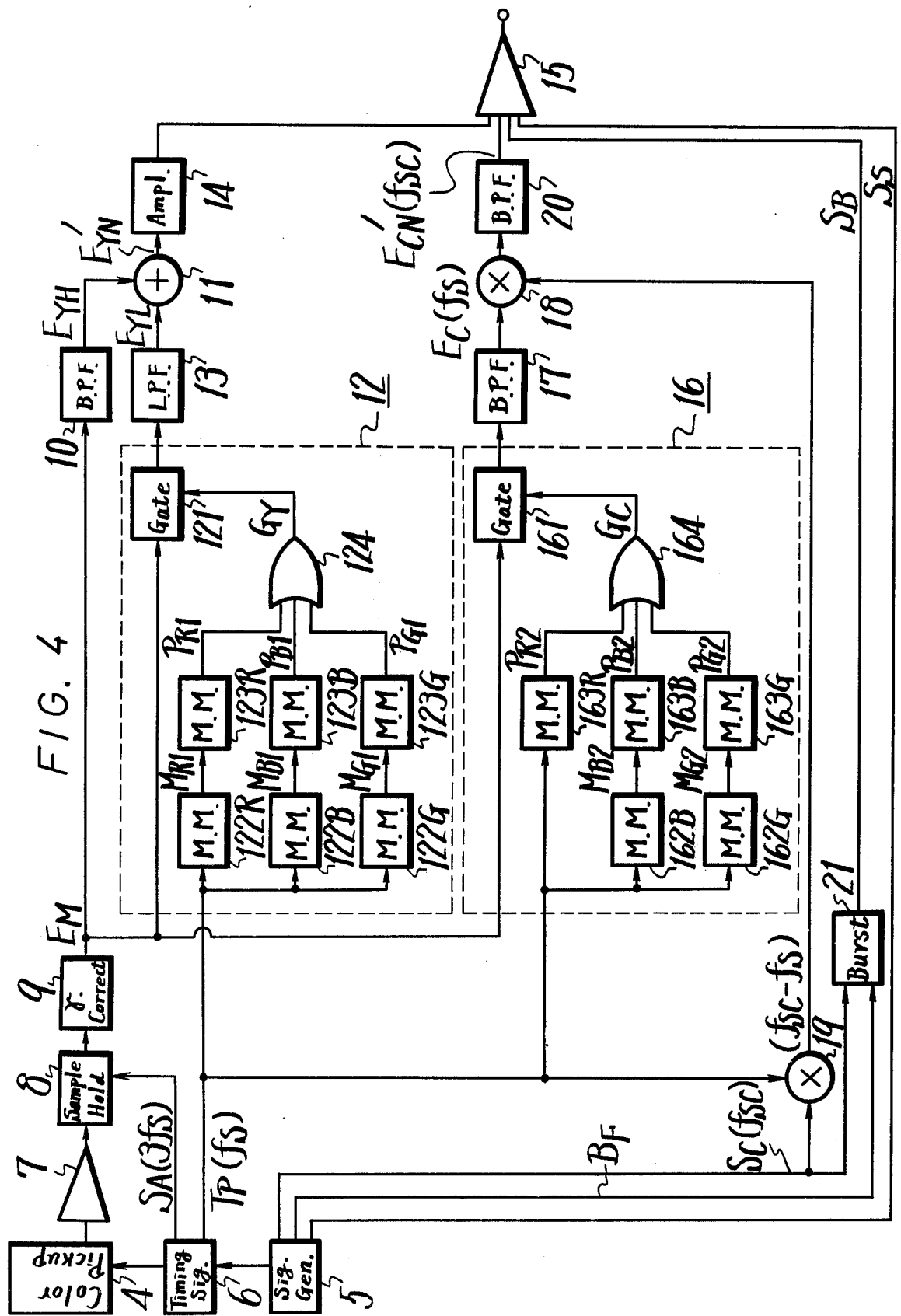
FIG. 4 is a block diagram showing one example of a signal processing system for a solid state television camera of this invention.

FIG. 4 shows one example of this invention in which such a dot-sequential color signal is caused to be coincident with an NTSC color television signal without using a decode-encode system.

In FIG. 4, reference numeral 4 designates a solid state color pickup device as described above. A synchronizing signal from a signal generator 5 is supplied to a timing signal generator 6 which derives therefrom a clock pulse, which is fed to the solid state color pickup device 4. In response to this clock pulse, the device 4 generates a dot-sequential color signal, which is fed through an amplifier 7 to a sample-hold circuit 8. The timing signal generator 6 also produces a sampling pulse $S_A$ having a frequency which is three times the frequency $f_s$ of the dot-sequential color signal. This sampling pulse $S_A$ is applied to the sample-hold circuit 8 where the red, green and blue color signals $E_R$, $E_G$ and $E_B$ are sampled and held. These signals are gamma ($\gamma$)—corrected by a $\gamma$—correction circuit 9.

Figure 7A:
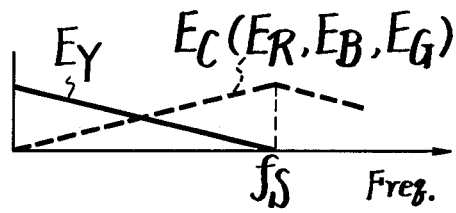
FIGS. 7A through 7E are waveform diagrams used for explaining this invention.

The $\gamma$-corrected signal from the circuit 9 consists of, as shown in FIG. 7A, a luminance signal component $E_Y$ which mainly occupies the low frequency range, and a modulated carrier component $E_C$ which is composed of chrominance signal components $E_R$, $E_B$ and $E_G$ each having the same carrier frequency $f_s$ relative to three primary colors.

This composite signal $E_M$ is expressed as follows:

$$E_M = E_Y + E_C \qquad (1)$$

$$E_Y = \tfrac{1}{3}(E_R + E_G + E_B)$$

$$E_C = \tfrac{1}{3} \times (\sin \pi/3)/\pi/3 [E_R \cos \omega_s t + E_B \cos(\omega_s t + 120°) + E_G \cos(\omega_s t + 240°)]$$

where $E_R$, $E_B$ and $E_G$ represent peak values of respective primary color signals of the dot-sequential color signal $E_M$.

Figure 5:
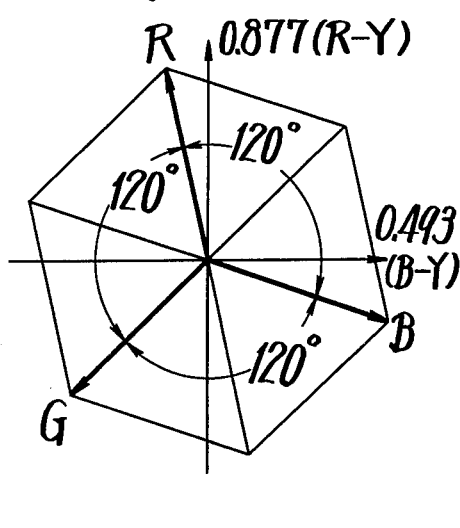
FIG. 5 and FIG. 6 are vector diagrams used for explaining this invention.

As shown in FIG. 5, the modulated carrier component $E_C$ is shown by vectors R, B and G which have the same amplitude but adjacent components differ in phase by 120° from each other.

Figure 6:
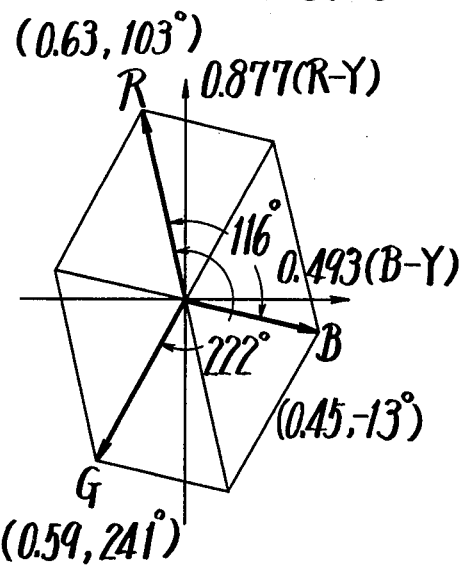

A chrominance carrier component $E_{CN}$ of an NTSC color television signal $E_N$ is shown in FIG. 6 and expressed as follows:

$$E_N = E_{CN} + E_{YN} \qquad (2)$$

$$E_{CN} = 0.63 E_R \sin(\omega t + 103°) + 0.59 E_G \sin(\omega t + 241°) + 0.45 E_B \sin(\omega t - 13°) \qquad (3)$$

$$E_{YN} = 0.30 E_R + 0.11 E_B + 0.59 E_G \qquad (4)$$

As is apparent from the above equations, the NTSC color television signal $E_N$ is a little different from the dot-sequential color signal $E_M$.

In this embodiment, this invention is applied to a circuit wherein the dot-sequential color signal $E_M$ obtained as mentioned above is converted directly into an NTSC color signal.

Figure 7B:
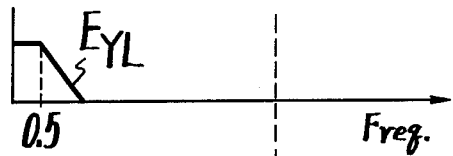
Figure 7C:
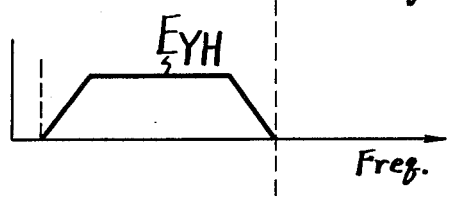

That is, the dot-sequential color signal $E_M$ (FIG. 8A) from the $\gamma$-correction circuit 9 is fed to a band pass filter 10 having a pass characteristic such as shown in FIG. 7C to drive therefrom a high frequency component $E_{YH}$ of the luminance signal, which is applied to an adder 11.

The dot-sequential color signal $E_M$ from the $\gamma$-correction circuit 9 is also supplied to signal processing circuits 12 and 16, respectively. Meanwhile, derived from the timing signal generator 6 is a timing pulse $T_P$ (FIG. 8B) having a frequency $f_s = 1/\tau_s$ such as one third of the frequency of the sampling pulse $S_A$. The timing pulse $T_P$ is synchronized with the pulse $S_A$ and occurs at a time corresponding to the edge of the red color signal component $E_R$. This timing pulse $T_P$ is fed to both of the processing circuits 12 and 16. Thus, the processing circuit 12 produces a signal such that the composing ratio of red, green and blue color signals satisfies equation (4), and the processing circuit 16 produces a signal such that the composing ratio of red, green and blue color signals and their phases satisfy the equation (3).

That is, in the processing circuit 12, the dot-sequential color signal $E_M$ is supplied to an analog-signal gate circuit 121. Meanwhile, the timing pulse $T_P$ from the timing signal generator 6 is applied to monostable multivibrators 122R, 122B and 122G, respectively, to trigger them at its falling edge. Thus, the multivibrator 122R supplies a pulse $M_{R1}$ which rises at the falling edge of the timing pulse $T_P$ and occurs at a position in time within the red color signal $E_R$ as shown in FIG. 8C. Similarly, the multivibrator 122B supplies a pulse $M_{B1}$ which falls at a position in time within the blue color signal $E_B$ as shown in FIG. 8E, and the multivibrator 122G supplies a pulse $M_{G1}$ which falls at a position in time within the green color signal $E_G$, in this case, at the edge of the green color signal $E_G$ as shown in FIG. 8G.

Next, these pulses $M_{R1}$, $M_{B1}$ and $M_{G1}$ are respectively applied to monostable multivibrators 123R, 123B and 123G to trigger them by respective the falling edges thereof to derive therefrom pulses $P_{R1}$ (FIG. 8D), $P_{B1}$ (FIG. 8F) and $P_{G1}$ (FIG. 8H), respectively, having pulse widths of $\tau_R$, $\tau_B$ and $\tau_G$. In this case, the apperture centers of these pulses are not changed and correspond to the center positions of the respective intervals of red, blue and green color signals. In this case, $\tau_R$, $\tau_B$ and $\tau_G$ are selected to satisfy $\tau_R/\tau_S = 0.17$, $\tau_B/\tau_S = 0.06$ and $\tau_G/\tau_S = 0.33$. In addition, the widths of the output pulses of multivibrators 123R, 123B and 123G are so selected that their aperture centers maintain their phases of sequential 120°-phase shifts.

The pulses $P_{R1}$, $P_{B1}$ and $P_{G1}$ are then applied to an OR circuit 124 to derive therefrom a gate signal $G_Y$ (FIG. 8I), which is supplied to the analog-signal gate circuit 121 to open it at an interval during which the signal $G_Y$ is in a state of "1". Thus, the gate circuit 121 produces a signal in which the color signals $E_R$, $E_B$ and $E_G$ are composed in a ratio of 0.17:0.06:0.33. This signal is supplied to a low pass filter 13 having a pass band characteristic as shown in FIG. 7B to derive therefrom a low frequency component $E_{YL}$ of the luminance signal $E_Y$. This low frequency component $E_{YL}$ is composed of red, blue and green color low frequency components $E_{RL}$, $E_{BL}$ and $E_{GL}$ in the following ratio:

$$E_{RL} : E_{BL} : E_{GL} = 0.17 : 0.06 : 0.33$$
$$= 0.30 : 0.11 : 0.59$$

The above ratio is substantially the same as the component ratio of the luminance signal in the NTSC color television signal.

The thus obtained low frequency luminance signal component $E_{YL}$ is fed to the adder 11 where it is added with the high frequency luminance signal component $E_{YH}$ from the band pass filter 10 to obtain a luminance signal $E_{YN}$ converted into the NTSC color television signal. This signal is supplied through a processor amplifier 14 to an amplifier 15.

In the signal processing circuit 16, as in the processing circuit 12, the dot-sequential color signal $E_M$ is fed to an analog-signal gate circuit 161. On the other hand, the timing pulse $T_P$ is supplied to monostable multivibrators 163R, 162B and 162G, respectively. Thus, the multivibrator 163R produces a pulse $P_{R2}$ (FIG. 8J) having a width $\tau_R'$ which satisfies $\tau_R'/\tau_S = 0.3$ for the red color signal $E_R$. The multivibrator 162B produces a pulse $M_{B2}$ which falls within a portion in time of blue color signal $E_B$ as shown in FIG. 8K. The pulse $M_{B2}$ is then fed to a monostable multivibrator 163B to trigger it by the falling edge of the pulse $M_{B2}$ to derive therefrom a pulse $P_{B2}$ (FIG. 8L) having a width $\tau_B'$ such as to satisfy $\tau_B'/\tau_S = 0.21$ with its phase delayed from that of the pulse $P_{R2}$ by 116°. Similarly, the multivibrator 162G produces a pulse $M_{G2}$ (FIG. 8M) which is fed to a monostable multivibrator 163G to derive therefrom a pulse $P_{G2}$ (FIG. 8N) having a width $\tau_G'$ such as to satisfy $\tau_G'/\tau_S = 0.30$ with its phase delayed from that of the pulse $P_{R2}$ by 222°. In this case, for the red color signal $E_R$ there is provided only one multivibrator 163R, because the falling edge of the timing pulse $T_P$ corresponds just to the edge of the red color signal $E_R$ and $\tau_R'$ is selected to cover all the interval of red color signal $E_R$. When the falling edge of the pulse $T_P$ is shifted from the edge of red color signal, a monostable multivibrator is necessarily provided in front of the multivibrator 163R in order to determine the rising position of the pulse $P_{R2}$.

Figure 7D:
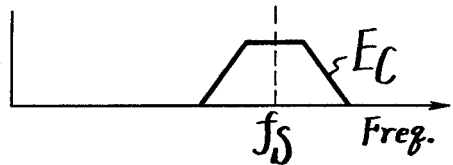

The pulses $P_{R2}$, $P_{B2}$ and $P_{G2}$ are then fed to an OR circuit 164 to derive therefrom a gate signal $G_C$ (FIG. 8O), which is supplied to the analog-signal gate circuit 161 to open it at an interval during which the signal $G_C$ maintains a state of "1". Thus, the gate circuit 161 produces a signal in which the color signals $E_R$, $E_B$ and $E_G$ are composed in a ratio of 0.63:0.45:0.59 and their phases satisfy the equation (3). This signal is applied to a band pass filter 17 having a pass band characteristic as shown in FIG. 7D to derive therefrom a chrominance signal $E_C$.

Figure 7E:
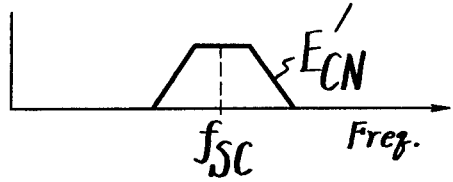

In other words, from the band pass filter 17 there is obtained the chrominance signal $E_C$ composed of color signals $E_R$, $E_B$ and $E_G$ with the same composition ratio and phases as those of the NTSC color television signal. The signal $E_C$ is delivered to a frequency converter 18. On the other hand, the signal generator 5 produces a signal $S_C$ having an NTSC subcarrier frequency $f_{sc}$ and this signal $S_C$ is supplied to a frequency converter 19 together with the timing pulse $T_P$ having the frequency $f_s$ from the timing signal generator 6 to derive therefrom a signal having a frequency $(f_{sc}-f_s)$. This signal is supplied to the frequency converter 18 to be combined with the signal $E_C$ to derive therefrom a signal $E_{CN}$ having its carrier frequency of $(f_{sc}-f_s)+f_s=f_{sc}$ and a signal having a frequency of $(f_{sc}-f_s)-f_s=f_{sc}-2f_s$. These signals are fed to a band pass filter 20 having a pass characteristic as shown in FIG. 7E to derive therefrom a chrominance signal $E_{CN}'$ having a carrier frequency $f_{sc}$ which corresponds to the subcarrier frequency of the NTSC color television signal. This signal $E_{CN}'$ is supplied to the amplifier 15.

Reference numeral 21 represents a burst signal forming circuit to which the signal generator 5 supplies the signal $S_C$ of the carrier frequency $f_{sc}$ and a burst flag pulse $B_F$ to intermittently produce a burst signal $S_B$ having a frequency $f_{sc}$ which is applied to the amplifier 15. The signal generator 5 also generates a composite synchronizing signal $S_S$ which is also fed to the amplifier 15. Thus, the amplifier 15 produces a signal which is coincident with the NTSC color television signal.

As described above, if the signal processing circuit of this invention is used in converting a dot-sequential color signal into an NTSC color television signal, it is not necessary to use the prior art process wherein a chrominance signal is once decoded. but the dot-sequential color signal can be converted directly into the NTSC color television signal with a substantially simplified circuit. Besides, it is not necessary for a color signal to pass through an unnecessary circuit as mentioned above and hence the color reproducibility of a picture is improved.

FIG. 9 shows another embodiment of this invention. Now, a consideration will be made of a case where a white color object is imaged by a color pickup device. In this case, even though the same white color object is imaged, the white color will not be correctly projected on a monitor screen due to color temperature of illumination at the position of the object and the like. Therefore, it is necessary to adjust the signal levels so that the white color object will always exhibit its white color correctly on the picture screen. In this embodiment, the signal processing system of this invention is used in the aforesaid white balance control.

In FIG. 9, elements corresponding to those in FIG. 4 are shown by the same reference numerals with their explanation being omitted. Reference numeral 22 denotes a signal processing circuit serving as a white balance control circuit. An analog-signal gate circuit 221 of the processing circuit 22 is applied with a dot-sequential color signal which is similarly fed from the solid state color pickup device 4 through sample-hold circuit 8 and γ-correction circuit 9. On the other hand, the timing pulse $T_P$ (FIG. 10B) from the timing signal generator 6 is supplied to monostable multivibrators 222R, 222B and 222G to trigger them by its falling edge to derive therefrom pulses $M_{R3}$ (FIG. 10C), $M_{B3}$ (FIG. 10E) and $M_{G3}$ (FIG. 10G) which are respectively used to determine the rising edges of signals for gating the red, blue and green color signals $E_R$, $E_B$ and $E_G$. These pulses $M_{R3}$, $M_{B3}$ and $M_{G3}$ are respectively supplied to monostable multivibrators 223R, 223B and 223G to trigger them by the falling edges thereof thereby producing pulses $P_{R3}$ (FIG. 10D), $P_{B3}$ (FIG. 10F) and $P_{G3}$ (FIG. 10H) having the same width $\tau_O$ with their phases being sequentially shifted by 120°. These pulses $P_{R3}$, $P_{B3}$ and $P_{G3}$ are applied to an OR circuit 224 to derive therefrom a composite signal $G_W$ (FIG. 10I), which is supplied to the analog-signal gate circuit 221 to gate the signal from the γ-correction circuit 9. As a result, the analog-signal gate circuit 221 delivers a signal in which red, blue and green color signal components are composed in a ratio of 1:1:1.

The output signal of the analog-signal gate circuit 221 is supplied to an NTSC conversion circuit 23 to be converted into an NTSC color signal by adjusting, for example, a synchronous detection axis and a modulation level during a process in which, for example, a chrominance signal is once synchronously-detected and the detected signal is again modulated to obtain a chrominance signal having a carrier frequency 3.58 MHz.

In this case, if the white color object is imaged by the color pickup device 4 to produce red, blue and green color signal components having the same amplitude, the analog-signal gate circuit 221 has derived therefrom a signal with the composition ratio of red, blue and green color signal components being 1:1:1. Therefore, the NTSC conversion circuit 23 is expected to produce no color carrier component but a luminance signal only with the result that a white color picture must be projected on the monitor screen.

In a practical case, however, even though the image of white color object is picked up as mentioned above, color signal components obtained from the color pickup device 4 are not the same in amplitude and hence a colored picture image appears on the monitor screen.

Accordingly, in this example, when the white color object is being imaged in order to control the white balance, linked white baance control switches 24 and 25 are closed. Then, red and blue color difference signals $E_{R-Y}$ and $E_{B-Y}$ produced by demodulating the chrominance signal in the NTSC conversion circuit 23 are respectively fed through the switches 24 and 25 to error detecting circuits 26 and 27. When the white balance is satisfactorily achieved, the color carrier component is zero and hence the color difference signals $E_{R-Y}$ and $E_{B-Y}$ are also zero. However, when the image on the monitor screen is colored, the error detecting circuits 26 and 27 are adapted to detect error voltages which are stored in memory circuits 28 and 29. The error voltage of red color difference signal stored in the memory circuit 28 is supplied to the monostable multivibrators 222R and 223R thereby to control the width of the pulse $P_{R3}$ with its center position being kept unchanged. The error voltage of blue color difference signal stored in the memory circuit 29 is also supplied to the monostable multivibrators 222B and 223B thereby to control the width of the pulse $P_{B3}$ with its center position being kept unchanged. In other words, when the picture on the monitor screen is colored red, the error detecting circuit 26 detects the red color and the detected signal is fed to the multivibrators 222R and 223R to reduce the width of pulse $P_{R3}$. Accordingly, a signal obtained from the analog-signal gate circuit 221 is adapted to have a small composition ratio of its red color signal component, so that the level of red color signal becomes low to achieve the white balance.

Thus, if the respective red, blue and green color signal components of the dot-sequential color signal are considered as pulsating signals having a carrier frequency $f_s$, the white balance control can be easily achieved by changing the pulse width only.

Further, the white balance can be similarly controlled in such a manner that a variable resistor is used as the resistor of each time constant circuit in the multivibrators 222R, 223R, 222B, 223B, 222G and 223G of the processing circuit 22 and this variable resistor is adjusted by hand while a monitored picture being viewed.

FIG. 11 shows a further embodiment of this invention, in which 32 indicates a signal processing circuit. The output signal of the color pickup device 4 is supplied to a first sample-hold circuit 30 where it is held, and an output of this first sample-hold circuit 30 is then fed to a second sample-hold circuit 31.

Meanwhile, the timing pulse $T_P$ from the timing signal generator 6 is utilized to obtain a gate signal $P_{R4}$ for red color signal portion by monostable multivibrators 322R and 323R, a gate signal $P_{B4}$ for blue color signal portion by monostable multivibrators 322B and 323B, a gate signal $P_{G4}$ for green color signal portion by monostable multivibrators 322G and 323G, respectively. Thus, a composite gate signal $G_A$ from an OR circuit 324 is supplied to the second sample-hold circuit 31, so that only during an interval where the gate signal $G_A$ maintain a state of "1", the output signal from the color pickup device 4 can be sampled and held in the second sample-hold circuit 31. In this case, the multivibrators 322R and 323R, 322B and 323B, and 322G and 323G are respectively applied with control signals from terminals 33R, 33B and 33G to change the widths of respective output pulses of these multivibrators thereby changing the holding duration of red, blue and green color signals in the second sample-hold circuit 31. As a result, the output signal or dot-sequential color signal from the solid state color pickup device 4 is gain-controlled.

In this case, it is also possible that variable resistors or the like can be adjusted by hand to change the widths of output pulses of the multivibrators 322R through 323G.

It will be apparent that many modifications and variations may be effected without departing from the scope of the novel concepts of this invention.

I claim as my invention:

1. A signal processing system for a solid state image sensor including an accumulation and for controlling the sensitivity of the image sensor under dynamic conditions comprising; a solid state imaging device means having a predetermined number of picture elements aligned in both the horizontal and vertical directions, means for deriving an output signal from said solid state imaging device means in response to an image projected thereon, and means for adjusting the pulse width of said output signal which has repeating cycles which are directly related to the alignment pitch of said picture elements in the horizontal direction and wherein said adjusting means is connected after accumulation has occurred.

2. A signal processing system as cited in claim 1, wherein said adjusting means includes an analog-signal gate circuit which is controllable with a gating pulse, and the adjusting operation is done by modifying the width of said gating pulse.

3. A signal processing system as cited in claim 1, wherein said adjusting means includes a sample-hold circuit and the holding time for said output signal is changed in order to control the gain of the adjusting means.

4. A signal processing system as cited in claim 1, wherein said adjusting means includes a pulse generating circuit for supplying control pulse signal train, and said control pulse is used for gating said output signal.

5. A signal processing system as cited in claim 4, wherein the aperture center of said control pulse is adjustable for modifying the phase relationship of said output signal.

* * * * *